(12) United States Patent
Ito et al.

(10) Patent No.: US 10,538,166 B2
(45) Date of Patent: Jan. 21, 2020

(54) PORTABLE CHARGER DEVICE, CONTACTLESS CHARGER SYSTEM FOR ELECTRIC WORK VEHICLE AND ELECTRIC GRASS MOWER MACHINE

(71) Applicant: Kubota Corporation, Osaka-shi (JP)

(72) Inventors: Hirokazu Ito, Sakai (JP); Yasuhiro Manji, Sakai (JP); Kazuaki Matsuda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/378,868

(22) Filed: Dec. 14, 2016

(65) Prior Publication Data

US 2017/0282733 A1 Oct. 5, 2017

(30) Foreign Application Priority Data

Mar. 29, 2016 (JP) .................................. 2016-065374
Apr. 7, 2016 (JP) .................................. 2016-077125

(51) Int. Cl.
*H02J 7/00* (2006.01)
*B60L 11/18* (2006.01)

(52) U.S. Cl.
CPC ......... *B60L 11/1829* (2013.01); *H02J 7/0027* (2013.01); *B60L 2200/40* (2013.01)

(58) Field of Classification Search
CPC .............. B60L 11/1829; B60L 11/185; B60L 2200/40; H02J 7/0027; H02J 7/0065
USPC ................................. 320/101, 103, 104, 108
See application file for complete search history.

(56) References Cited

U.S. PATENT DOCUMENTS

| | | | |
|---|---|---|---|
| 4,174,014 A | 11/1979 | Bjorksten |
| 4,267,895 A | 5/1981 | Eggert, Jr. |
| 4,589,249 A | 5/1986 | Walker et al. |
| 5,156,225 A | 10/1992 | Murrin |
| 5,639,571 A | 6/1997 | Waters et al. |
| 5,704,644 A | 1/1998 | Jaggi |
| 5,821,731 A | 10/1998 | Kuki et al. |
| 5,850,135 A | 12/1998 | Kuki et al. |
| 7,771,865 B2 | 8/2010 | Takasaki et al. |
| 7,926,602 B2 | 4/2011 | Takasaki |
| 8,464,817 B2 | 6/2013 | Usami et al. |
| 8,717,761 B2 | 5/2014 | Aoki et al. |
| 8,776,927 B2 | 7/2014 | Akazawa et al. |
| 8,789,634 B2 | 7/2014 | Nitawaki |
| 9,160,042 B2 | 10/2015 | Fujii et al. |
| 9,346,346 B2 | 5/2016 | Murray |
| 9,731,760 B2 | 8/2017 | Ito et al. |

(Continued)

FOREIGN PATENT DOCUMENTS

| | | |
|---|---|---|
| JP | S47006508 U1 | 9/1972 |
| JP | 620124 A | 3/1994 |

(Continued)

*Primary Examiner* — Edward Tso
*Assistant Examiner* — Aaron Piggush
(74) *Attorney, Agent, or Firm* — The Webb Law Firm (57) ABSTRACT

A portable charger device 200 includes a charger device side battery 3, a first charging control section 31 for non-quick charging of the charger device side battery 3 by power supply from an external power source 8, and a second charging control section 32 for quick charging of a vehicle side battery 4 mounted on an electric vehicle 100 by power supply from the charger device side battery 3.

6 Claims, 9 Drawing Sheets

(56) References Cited

U.S. PATENT DOCUMENTS

| | | | |
|---|---|---|---|
| 2005/0075768 A1* | 4/2005 | Nicholson | G06F 1/263 |
| | | | 701/31.4 |
| 2009/0186266 A1 | 7/2009 | Nishino et al. | |
| 2010/0141201 A1* | 6/2010 | Littrell | H02J 7/35 |
| | | | 320/101 |
| 2011/0181018 A1* | 7/2011 | Bruneau | B60P 3/10 |
| | | | 280/414.1 |
| 2011/0247886 A1 | 10/2011 | Sasahara et al. | |
| 2012/0323420 A1 | 12/2012 | Koike et al. | |
| 2013/0252059 A1 | 9/2013 | Choi et al. | |
| 2014/0240947 A1 | 8/2014 | Nakamura et al. | |
| 2014/0320078 A1 | 10/2014 | Nakamura et al. | |
| 2014/0338999 A1 | 11/2014 | Fujii et al. | |
| 2014/0375272 A1* | 12/2014 | Johnsen | B60L 11/1824 |
| | | | 320/136 |
| 2015/0039171 A1 | 2/2015 | Koike et al. | |
| 2015/0291019 A1 | 10/2015 | Hatta et al. | |
| 2017/0217488 A1 | 8/2017 | Koike et al. | |

FOREIGN PATENT DOCUMENTS

| | | |
|---|---|---|
| JP | 965747 A | 3/1997 |
| JP | 9213378 A | 8/1997 |
| JP | 1198710 A | 4/1999 |
| JP | 2003102104 A | 4/2003 |
| JP | 2008105645 A | 5/2008 |
| JP | 2008168869 A | 7/2008 |
| JP | 200997270 A | 5/2009 |
| JP | 2009248708 A | 10/2009 |
| JP | 2010200393 A | 9/2010 |
| JP | 2011177106 A | 9/2011 |
| JP | 2011218951 A | 11/2011 |
| JP | 2012201188 A | 10/2012 |
| JP | 20131228 A | 1/2013 |
| JP | 2013175296 A | 9/2013 |
| JP | 201482339 A | 5/2014 |
| JP | 2014084034 A | 5/2014 |
| JP | 2014118773 A | 6/2014 |
| JP | 2014135236 A | 7/2014 |
| JP | 2015001933 A | 1/2015 |
| JP | 201556957 A | 3/2015 |
| JP | 2015123751 A | 7/2015 |
| JP | 2015198076 A | 11/2015 |
| JP | 201610382 A | 1/2016 |
| WO | 2013076804 A1 | 5/2013 |
| WO | 2014069270 A1 | 5/2014 |

* cited by examiner

PORTABLE CHARGER DEVICE, CONTACTLESS CHARGER SYSTEM FOR ELECTRIC WORK VEHICLE AND ELECTRIC GRASS MOWER MACHINE

CROSS-REFERENCE TO RELATED APPLICATIONS

This application claims priority to Japanese Patent Application Nos. 2016-065374 and 2016-077125, filed Mar. 29, 2016 and Apr. 7, 2016, respectively, the disclosures of which are hereby incorporated in their entirety by reference.

TECHNICAL FIELD

The present invention relates to a portable charger device for charging a vehicle side battery mounted on an electric vehicle.

The invention relates also to a contactless charger system for an electric work vehicle as well as to an electric grass mower machine including such contactless charger system.

BACKGROUND ART

An electric vehicle mounting a battery and an electric motor as a driving source has advantages of no exhaust gas emission and less noise generation. However, in the event of vehicle stall due to battery power exhaustion, unlike a conventional gasoline engine vehicle, it is not possible to revive the vehicle by carrying in an amount of gasoline, but the vehicle needs to be towed to a nearby charger station by a tow track. Also, if a large battery is mounted for enabling driving for an extended period, there will arise a problem of increase of vehicle weight and vehicle occupying space. In particular, increase of vehicle body weight invites such inconveniences as need for increase of vehicle body strength, deterioration of fuel consumption efficiency.

Then, in an attempt to restrict occurrence of such problems as above, e.g. Japanese Unexamined Patent Application Publication No. 2010-200393 proposes an auxiliary battery charger device for an electric vehicle comprising a towed vehicle mounting an auxiliary battery and a charger and configured to be towed by the electric vehicle. This auxiliary battery device includes a connection arm for towing by the electric vehicle and a connection cable for connecting a battery of the electric vehicle to the charger. When the charged power of the battery of the electric vehicle has been used up, this battery and the auxiliary battery will be connected via the connection cable, so that the battery of the electric vehicle can be charged.

In a fork lift disclosed in Japanese Unexamined Patent Application Publication No. 2014-082339 (FIGS. 7-17), a secondary side contactless power transfer pad (a secondary coil) configured to receive electric power via electromagnetic coupling with a primary side contactless power transfer pad (a primary coil) installed on a ground surface is provided between front wheels and rear wheels and mounted to a lower face of one lateral face of the fork lift. In the case of such fork lift, there is relatively ample space available between the front wheels and the rear wheels under the vehicle body in case a fork lift mechanism as an utility implement mounted on the traveling vehicle body is disposed forwardly of the front wheels. Therefore, the secondary side coil can be disposed between the front wheels and the rear wheels. The primary side coil is provided on the ground surface or a support platform installed on the ground surface.

SUMMARY OF THE INVENTION

In the case of the auxiliary battery device disclosed in Japanese Unexamined Patent Application Publication No. 2010-200393, if charged power exhaustion occurs in the battery of the electric vehicle, charging can be carried out immediately. However, this JP No. 2010-200393 Publication document lacks detailed discussion about charging of the auxiliary battery provided in the auxiliary battery device and does not contemplate effecting both charging of the battery mounted on the auxiliary battery device and charging of the electric vehicle in an efficient manner.

In view of the above, there is a need for a portable charger device that allows charging of a battery mounted on an auxiliary battery device and charging of a vehicle side battery mounted on an electric vehicle in an effective manner.

Moreover, in the case of an electric grass mower machine, its mower unit as a utility implement to be mounted on a traveling vehicle body is disposed forwardly of the rear wheels. So, freely usable space under the vehicle body frame in the region forwardly of the rear wheels, that is, in the region near the ground surface is limited. Further, due to the large weight of the battery, it is preferred that a battery pack be disposed at a low position of the vehicle body from the viewpoint of vehicle body stability. For this reason, in the contactless charger system for use in an electric work vehicle such as an electric grass mower machine, appropriate layout of the battery pack and the primary and secondary coils is important.

A portable charger device for charging a vehicle side battery mounted on an electric vehicle according to the present invention comprises:

a charger device side battery;

a first charging control section for non-quick charging of the charger device side battery by power supply from an external power source; and a second charging control section for quick charging of the vehicle side battery by power supply from the charger device side battery.

Quick charging of a battery capable of repeated charging and discharging such as a lead-acid battery, a lithium battery is to handle a higher voltage than voltage handled in a non-quick charging (its charging speed is twice or a few times lower than quick charging), so its charging control system is exposed to a significant charging load. With the above-described configuration, as for the vehicle side battery of the electric work vehicle, the situation requires emergency, so quick charging is effected via the second charging control section. On the other hand, charging of the charger device side battery is to be effected when the electric vehicle is out of service, such as during night time, thus not requiring emergency. Therefore, charging thereof is effected via the non-quick charging type first charging control section. As a result, there is realized charging/discharging of the charger device side battery, taking balance between emergency and charging control load into consideration.

With the portable charger device, at the time of charging to the vehicle side battery and charging to the charger device side battery of its own, the charger device needs to be moved to a position suitable for respective charging. In order to assist movement thereof by man power, according to one preferred embodiment of the present invention, the portable charger device includes a wheeled frame.

As this portable charger device needs to accompany traveling of the electric vehicle, it will be advantageous for the charger device to be mounted on the electric vehicle or to be towed by the electric vehicle. In case the device is mounted on the electric vehicle, this results not only in increase of the loading weight of the electric vehicle, but also in need for its loading space. For this reason, according to one preferred embodiment of the present invention, the wheeled frame comprises a towed vehicle body that can be towed by the electric vehicle. With this, the space for loading the portable charger device becomes unnecessary and load on the electric vehicle is reduced also.

In case the electric vehicle is a work vehicle such as an agricultural machine or a civil engineering machine, while the work vehicle is engaged in a work, the portable charger device is to be left in the periphery of the site of work. Work by a work vehicle will be effected generally during daytime and in a situation free from rainfall, so the portable charger device is to be exposed to sunbeam. As sunbeam can be used a source of electric energy, according to one preferred embodiment of the present invention, there are provided a solar cell unit and a third charging control section for charging the charger device side battery by power supply from the solar cell unit. With this arrangement, the charger device side battery of the portable charger device can be charged by sun light. Thus, energy saving is achieved and eventually there is obtained an advantage of reduction of running cost of the electric vehicle.

The charger device side battery of the portable charger device is charged often during night time. Therefore, it will be advantageous to arrange such that commercial AC power source whose night time electricity cost is low is employed as the external power source. However, in consideration also to a situation where charging is needed at a site lacking such commercial AC power source, it will be advantageous to arrange such that a car 12V battery also can be used as the external power source.

A contactless charger system for an electric work vehicle, according to the present invention, comprises:

a primary coil unit including a coil power supply circuit section and a primary coil disposed upwardly of the coil power supply circuit section, the primary coil unit being disposed on a ground surface;

a battery pack disposed at a rear portion of a vehicle body frame and between a pair of left and right rear wheels;

a secondary coil to be electromagnetically coupled with the primary coil;

a charging circuit section for rectifying power from the secondary coil and then supplying the rectified power to the battery pack; and a coil supporting member configured to dispose the secondary coil at a lower portion of the battery pack.

With the above-described configuration, on the ground surface side, thee is disposed a primary coil unit having a coil power supply circuit section and a primary coil; whereas on the vehicle body side of the electric work vehicle, there is mounted a secondary coil to be electromagnetically coupled with the primary coil. The secondary coil is disposed, by a coil supporting member, at a lower portion of the battery pack which is disposed at a rear portion of the vehicle body frame and between the pair of left and right rear wheels. In order to avoid accidental contact with an obstacle which may be present on the ground surface during traveling, the secondary coil is disposed at as high as possible position from the ground surface. So, the position of the primary coil needs to be high. With the above configuration, the primary coil unit comprises a two-level structure, with the coil power supply circuit section being disposed in the lower level, and the primary coil unit being disposed in the upper level. Therefore, there is obtained a structural advantage of the primary coil unit being disposed at a position high from the ground surface.

The charging circuit section has a relatively large shape since it includes a rectifier through which a large current flows. So, a large and stable installing site will be needed therefor. For this reason, according to one preferred embodiment of the present invention, the charging circuit section is attached to an upper portion of the battery pack. As the battery pack has a relative simple outer shape such as a rectangular solid or a combination of a rectangular solids, etc., its upper portion is relatively large and flat, so the charging circuit section can be attached to this portion in a stable manner.

Further, according to one preferred embodiment of the present invention, at a rear side lower portion of the battery pack, a recess is formed, and the secondary coil is disposed in this recess. With this arrangement, as the secondary coil is protected for at least a circumferential portion thereof by the battery pack having high rigidity, e.g. damage due to accidental contact with the outside can be suppressed.

When the air pressure of the rear wheels varies or the additional load varies, the ground-height of the secondary coil attached to the opposed sides of the electric work vehicle will vary accordingly. And, the spacing between the primary coil and the secondary coil will deviate from an optimal value. This will affect the charging efficiency adversely. Therefore, it is necessary to make the spacing between the primary coil and the second coil as close as possible to the optimal value. To this end, according to one preferred embodiment of the present invention, the primary coil unit includes a lift mechanism for lifting the primary coil up/down. By this lift mechanism, the ground-height of the primary coil can be adjusted for setting the spacing between the primary coil and the secondary coil to the optimal value.

According to one preferred embodiment of an electric grass mower machine including the contactless charger system of the invention, a mower unit is suspended from a front portion of the vehicle body frame to be liftable up/down; and an electric motor unit for driving the rear wheels by power supplied from the battery pack via the motor power supply circuit section is disposed between the rear wheels and forwardly of an axis of the rear wheels. With this arrangement, the problem of deterioration of vehicle body balance due to the arrangement of disposing the battery pack at a rear portion of the vehicle body frame, thus forming a vehicle body center of gravity rearward of the vehicle body can be solved by the mower unit and the electric motor unit.

Further, according to a further preferred embodiment of the electric grass mower machine relating to the present invention, the electric motor unit comprises a left motor for driving one rear wheel via a left transmission and a right motor for driving the other rear wheel via a right transmission; and the left motor and the left transmission are disposed between the one rear wheel and the battery pack.

With the above arrangement, such heavy components as the electric motor unit and the transmission are disposed in a concentrated manner in the vicinity of the axles of the rear wheels, so there are realized stability of vehicle body and compactization of the traveling power transmission line.

The mower unit will approach the ground surface during traveling involving a grass mowing work and will be lifted up to its maximum upper position, thus being distant from the ground surface, during no-work involved traveling. As the mower unit is disposed more forwardly of the vehicle body than the secondary coil, the mower unit plays a roll as a "guard" for the secondary coil during traveling. For this reason, preferably, a lower face of the mower unit when located at the maximum upper position is set to be lower than a lower face of the secondary coil.

EMBODIMENTS

First Embodiment

Figure 1:
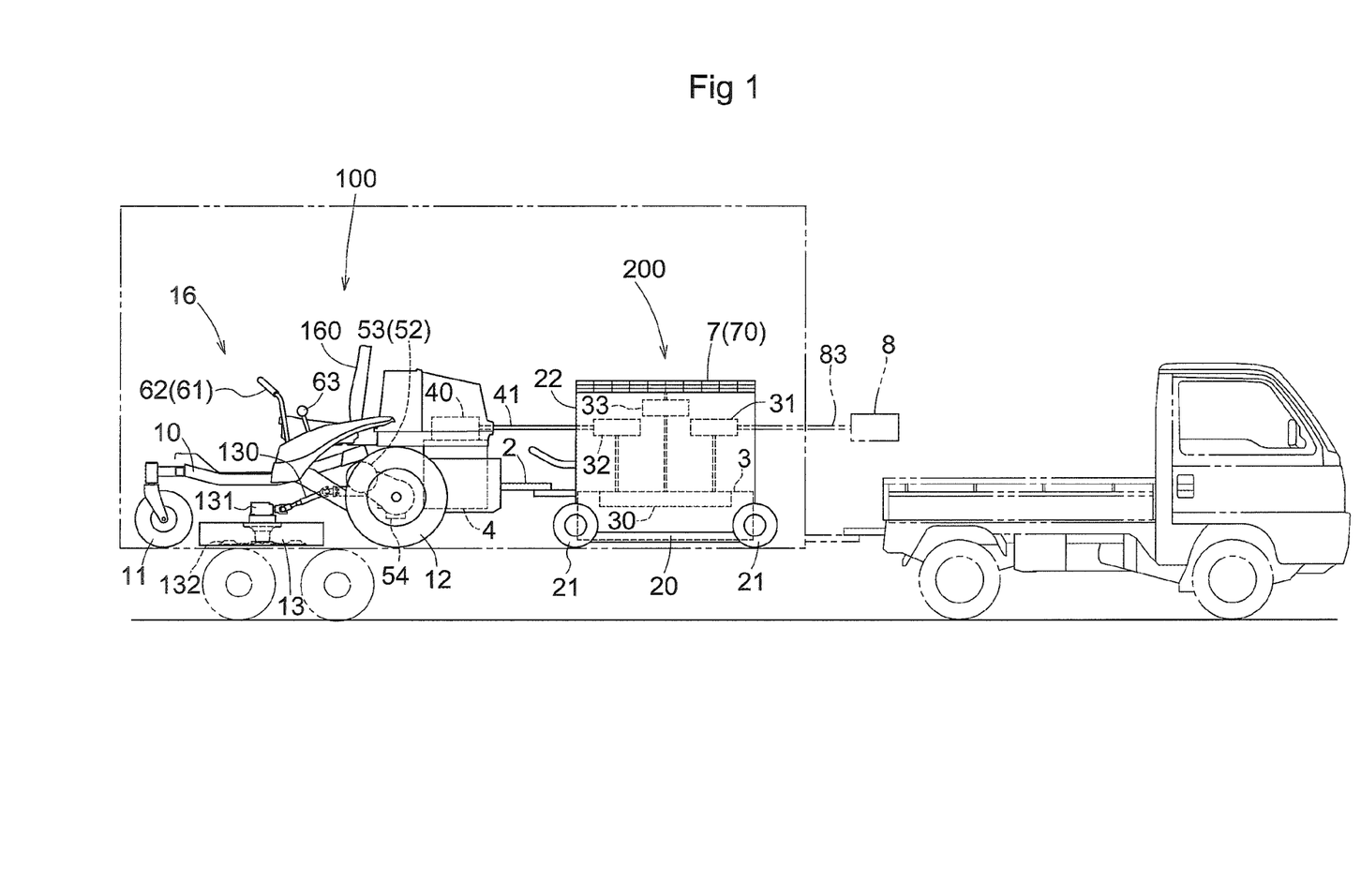
FIG. 1 is a schematic view for explaining one embodiment of a portable charger device for charging a vehicle side battery mounted on an electric vehicle relating to the present invention.

Next, with reference to the accompanying drawings, there will be explained an embodiment of a portable charger device for charging a vehicle side battery mounted on an electric vehicle according to the present invention. As shown in FIG. 1, in the instant embodiment, the electric vehicle comprises an electric grass mower machine 100 and the portable charger device 200 is constituted of a towed vehicle body that can be towed by this electric grass mower machine 100. The portable charger device 200 includes a vehicle body frame 20 to which wheels 21 are attached. The vehicle body frame 20 mounts a box-like housing 22. Inside this housing 22, a charger device side battery 3 is mounted. On a roof region of the housing 22, there is provided a solar cell panel 70 constituting a solar cell unit 7. The portable charger device 200, configured as a cart type, is connected to a rear portion of the electric grass mower machine 100 via a towing connection rod 2, so that the device 200 can be towed by the electric grass mower machine 100. As represented by two-dotted chain line in FIG. 1, for movement to a distant grass mowing site, the electric grass mower machine 100 and the portable charger device 200 will be loaded on a trailer and towed by a truck or a passenger's car.

As schematically shown in FIG. 1, the electric grass mower machine (to be referred to simply as "a grass mower machine" hereinafter) 100 includes a vehicle body 10 supported on a ground surface by a pair of left and right front wheels 11 and a pair of left and right rear wheels 12 as driving wheels to be rotatably driven. Between the front wheels 11 and the rear wheels 12, a mower unit 13 is suspended from the vehicle body 10 via an unillustrated lift mechanism. The mower unit 13 includes a cutter blade transmission mechanism 131 and a cutter blade 132 rotated by this cutter blade transmission mechanism 131. At a vehicle body front/rear center region of the vehicle body 10, a driving section 16 is disposed. Thus, a driver's seat 160 is disposed via a seat supporting body at a vehicle body front-rear center region of the vehicle body 10. At a rear region of the vehicle body 10, a vehicle side battery 4 is disposed.

At the center portion of the vehicle body 10, there are mounted a left motor 52 for driving the left rear wheel 12 and a right motor 53 for driving the right rear wheel 12. The left motor 52 and the right motor 53 use the vehicle side battery 4 as a power source therefor and are driven and controlled in variable speeds independently of each other. With this, a straight forward traveling is created by driving both of the left and right rear wheels 12 at a same speed or substantially same speeds in the forward direction. Further, by differing the speeds of the left and right rear wheels 12 from each other, the vehicle body 10 can be steered in a desired direction. For instance, by driving either one of the left and right rear wheels 12 at a low speed near a zero speed and driving the other rear wheel 12 at a higher speed to the forward side or reverse side, a small turn is made possible. Furthermore, by driving the left and right rear wheels 12 in opposite directions to each other, the vehicle body 10 can make a spin turn about a pivot at the substantial center of the left and right rear wheels 12. The left and right pair of front wheels 11 are comprised of caster wheels, so that their directions can be freely changed about a vertical axis. Thu, in accordance with the direction of traveling by the rear wheels 12, the directions will be corrected.

Speed changing operations for the left motor 52 and the right motor 53 are effected by a left operational lever 61 and a right operational lever 62 which are disposed on opposed sides of the driver's seat 16 shown in FIG. 1. Regarding each of the left operational lever 61 and the right operational lever 62, when the lever is maintained at a front-rear neutral position, the vehicle body 10 is placed under a stop state. When the lever is operated forwardly from the neutral position, a forward speed change is realized. When the lever is operated rearwardly, a reverse speed change is realized. Between the left motor 52 and the right motor 53, there is provided a cutter blade motor 54 for providing power to the cutter blade 132 of the mower unit 13. The cutter blade motor 54 has an output shaft that extends forwardly in the vehicle body front-rear direction and power is transmitted to the cutter blade transmission mechanism 131 of the mower unit 13 via a relay shaft 130. The cutter blade motor 54 uses the vehicle side battery 4 as a power source therefor.

Figure 2:
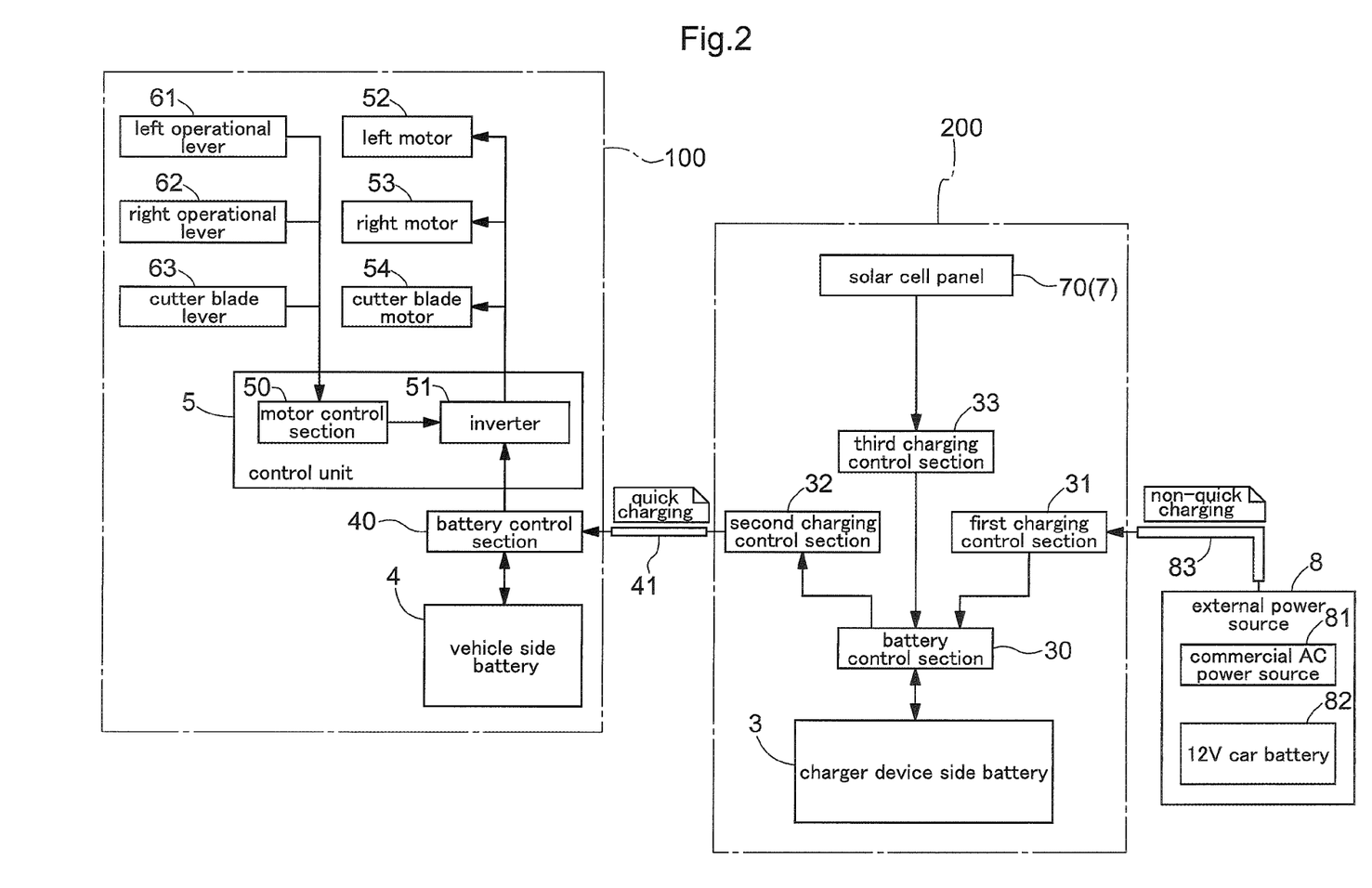
FIG. 2 is a diagram of a charging/discharging line between an electric grass mower machine and the portable charger device.

As schematically shown in FIG. 2, the portable charger device 200 includes a first charging control section 31, a second charging control section 32 and a third charging control section 33. The first charging control section 31 charges the charger device side battery 3 by power supply from an external power source 8. Charging of the charger device side battery 3 by this first charging control section 31 is effected as non-quick charging, namely, normal charging with no significant increasing of the voltage involved. As the external power source 8 handled by the first charging control section 31, in the instant embodiment, at least a commercial AC power source 81 and a 12 V car battery 82 can be used. The commercial AC power source 81 is 100 V power source or 200 V power source installed in a private residence. With using this power source and without concern about time, taking advantage of the night time discounted rate, the charger device side battery 3 can be charged. Further, when out on a grass mowing site with the grass mower machine 100, as an emergency measure in the event of charged battery capacity shortage of the charger device side battery 3, this charger device side battery 3 can be charged also with using the 12V car battery mounted on the towing vehicle of this portable charger device 100 or on an other automobile vehicle. When a power cable 83 is connected to respective connectors of the external power source 8 and the portable charger device 200, the external power source 8 and the charger side battery 3 are connected to be able to effect power transfer therebetween.

The second charging control section 32 converts electric power supplied from the charger device side battery 3 into a power suitable for charging the vehicle side battery 4 and transfers such power to the battery 4. This charging of the vehicle side battery 4 by the second charging control section 32 is effected as quick charging. To this end, the second charging control section 32 includes a DCDC converter for covering the power supplied from the charger device side battery 3 to a higher voltage. This charging of the vehicle side battery 4 by the second charging control section 32 is effected as quick charging. When a power cable 41 is connected to respective connectors of the grass mower machine 100 and the portable charger device 200, the charger device side battery 3 and the vehicle side battery 4 are connected to be able to power transfer therebetween.

The second charging control section 32 boosts the voltage for quick charging the vehicle side battery 4. In contrast, the first charging control section 31 does not boost the voltage for non-quick (normal) charging the vehicle side battery 4. For this reason, the first charging control section 31 does not require such DCDC converter for conversion to high voltage, like the DCDC converter provided in the second charging control section 32.

The third charging control section 33, though provided only as an optional function, effects charging of the charger device battery 3 with utilizing of power supply from the solar cell unit 7 provided in the portable charger device 200. By effecting charging by the solar cell unit 7 while the grass mower machine 100 is engaged in a grass mowing work, effective energy utilization is realized.

The charger device side battery 3 and the vehicle side battery 4 respectively include additionally a battery control section 30 and a battery control section 40 that includes a switch for shutting off power supply for emergency at the time of charging or discharging, and so on. These battery control sections 30 and 40 have a well-known arrangement, so explanation thereof will be omitted herein.

As shown in FIG. 2, the control unit 5 of the grass mower machine 100 includes a motor control section 50 for controlling driving of the left motor 52, the right motor 53 and the cutter blade motor 54. The motor control section 50 provides control signals to an inverter 51 with using the vehicle side battery 4 as a power source, whereby the left motor 52, the right motor 53 and the cutter blade motor 54 are driven at respectively appropriate rotational speeds or torques. The control unit 5 is configured to receive inputs of operation detection signals from sensors for detecting operational displacements of the left operational lever 61, the right operational lever 62 and the cutter blade lever 63 and based on these operation detection signals, the motor control section 50 generates control signals and transmit these to the inverter 51.

The charged power capacity of the charger device side battery 3 need not exceed the charged power capacity of the vehicle side battery 4, since the charger device side battery 3 is an auxiliary battery which is used mainly for emergency. Notwithstanding, it still will be advantageous if the charged power capacity of the charger device side battery 3 is about a half of that of the vehicle side battery 4, in order to minimize possibility of unintended interruption of a grass mowing work by the grass mower machine 100.

Alternative Embodiments of First Embodiment (1) In the discussion of the foregoing embodiment, it was described that the first charging control section 31 and the second charging control section 32 are provided as separate entities. Instead, these can be commonalized at least partially. Further, in case the third charging control section 33 is to be provided, the first charging control section 31, the second charging control section 32 and this third charging control section 33 can be commonalized at least partially.

(2) In the foregoing embodiment, as an example of the electric vehicle, an electric grass mower machine which is an electric work vehicle was cited. Instead, the present invention is applicable also to an agricultural work machine or a vehicle such as a rice planter, a combine harvester or a tractor or a civil engineering machine or vehicle such as a backhoe, a bucket loader, etc. or even to an electric passenger car.

(3) The present invention is applicable to a portable charger device configured to charge a vehicle side battery mounted on an electric vehicle.

Second Embodiment

Figure 3:
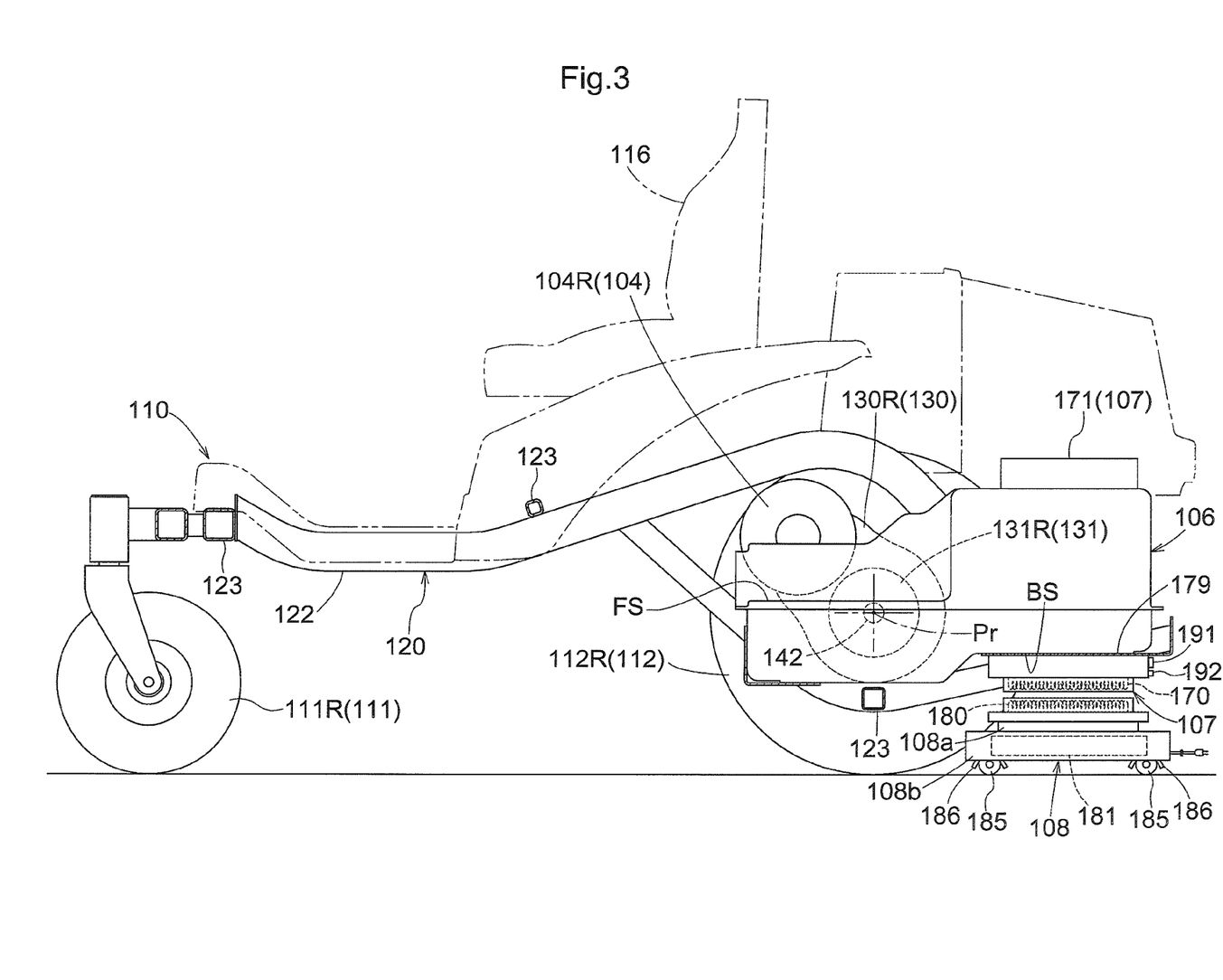
FIG. 3 is a side view schematically showing a basic configuration of an electric work vehicle including a contactless charger system.
Figure 4:
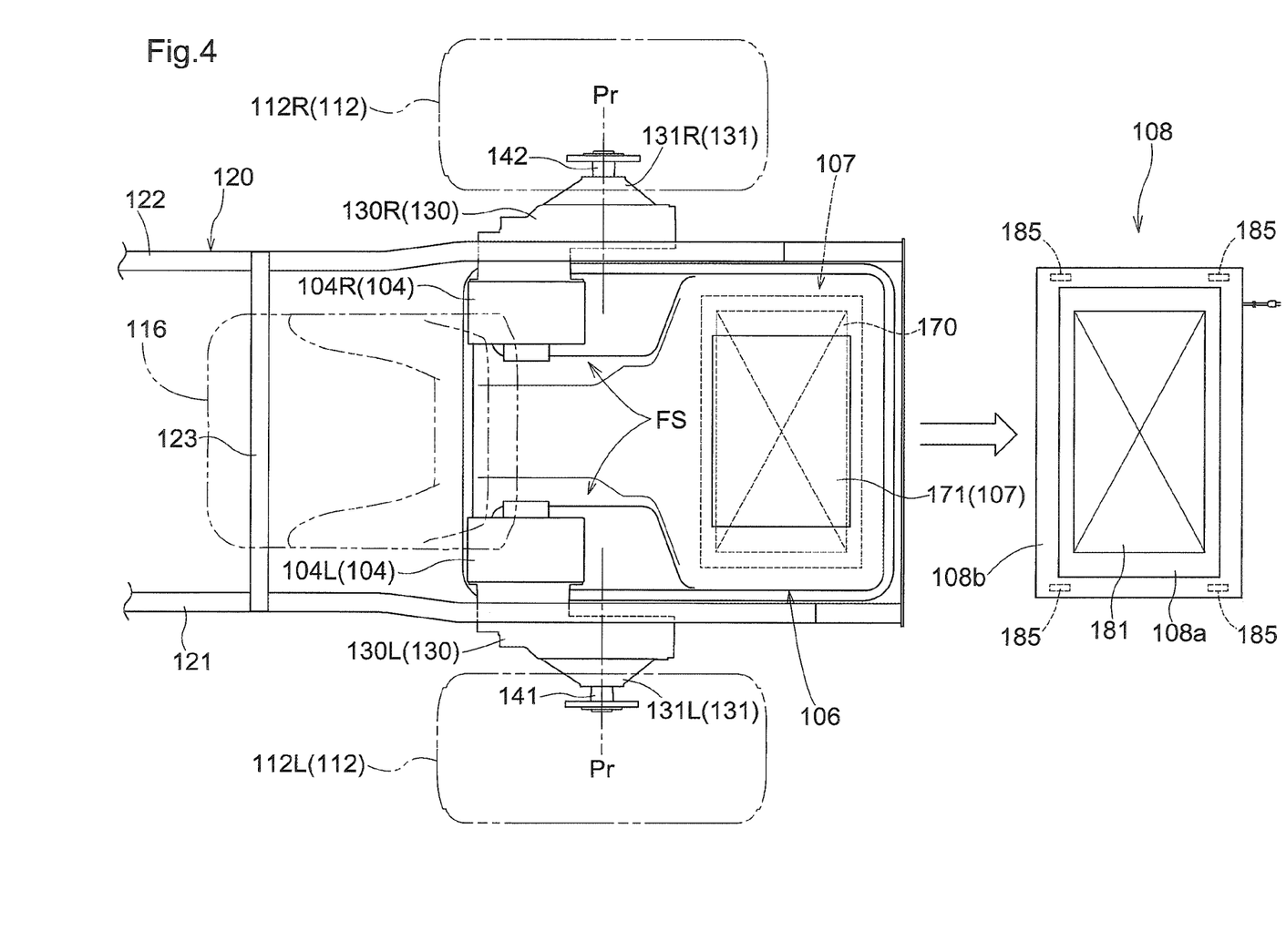
FIG. 4 is a plane view schematically showing the basic configuration of the electric work vehicle including the contactless charger system.

Next, with reference to FIG. 3 and FIG. 4, a basic configuration of an electric work vehicle including the contactless charger system will be explained. Incidentally, in this specification, a vehicle body front-rear direction is the direction of the vehicle body center axis (may be referred to as "vehicle body longitudinal axis" also) that extends horizontally along the traveling direction of the vehicle body. A vehicle body transverse direction (may be referred to simply as "transverse direction") is the direction horizontally extending perpendicularly to the vehicle body center axis. The term front (forward) refers to the forward side in the vehicle body front-rear direction and the term rear (reverse) refers to the reverse side in the vehicle body front-rear direction. Further, the term "left" (left side) refers to the left as facing the vehicle body forward traveling direction and the term "right" (right side) refers to the right as facing the vehicle body forward traveling direction.

This electric work vehicle includes a vehicle body frame 120 including a left frame 121 and a right frame 122 that extend in the vehicle body front-rear direction and spaced apart from each other in the vehicle body transverse direction, and at least one cross beam 123 interconnecting the left frame 121 and the right frame 122. A left front wheel 111L and a right front wheel 111R that together constitute a front wheel unit 111 are disposed at front portions of the vehicle body frame 120. A left rear wheel 121L and a right rear wheel 121R that together constitute a rear wheel unit 112 are disposed on more rear side than the center of the vehicle body frame 120. In the following discussion, when no particular distinction therebetween is needed, the left front wheel 111L and the right front wheels 111R will be generically referred to by the language the "front wheel unit 111". And, the left rear wheel 112L and the right rear wheel 112R will be generically referred to by the language "rear wheel unit 112". A rear wheel axis Pr extends in the vehicle body transverse direction.

A battery pack 106 is disposed between the left frame 121 and the right frame 122 and in a rear half region of the vehicle body frame 120. As seen in its side view, the front end portion of the battery pack 106 is located more forwardly than the rear wheel axis Pr and substantially adjacent the front end of the rear wheel unit 112. The rear end of the battery pack 106 is located substantially at the rear end of the vehicle body frame 120. As may be apparent from FIG. 4 illustration, the battery pack 6 has a width that is almost gaplessly confined between the left frame 121 and the right frame 122 and extends with an equal width into the axle space of the rear wheel unit 112. The battery pack 106 has a shape like an approximately rectangular solid with front and rear upper regions thereof being cut away therefrom. This cut rear upper region creates a rear recess BS of the flat rectangular solid and the cut front upper region creates a font recess FS of the flat rectangular solid, respectively.

The electric motor unit 104 that drives the rear wheel unit 112 constituting the rear wheels consists of a left motor 104L that transmits its rotational power to the left rear wheel 112L and a right motor 104R that transmits its rotational power to the right rear wheel 112R. As shown in FIG. 4, the left motor 104L extends into a left region of the front recess FS and the right motor 104R extends into a right region of the front recess FS. The left motor 104L and the right rear wheel 112R are disposed at left-right symmetric positions. The left motor 104L and a left rear axle case 131L are connected via a left transmission 103L. The right motor 104R and a right rear axle case 131R are connected via a right transmission 130R. Incidentally, the left transmission 130L is disposed on the outer side of the left frame 121 and the right transmission 130R is disposed on the outer side of the right frame 122. The left motor 104L and the right motor 104R will be generically referred to as the electric motor unit 104. The left transmission 130L and the right transmission unit 130R will be generically referred to as a transmission unit 130. The left rear axle case 131L and the right rear axle case 131R will be generically referred to as a rear axle case 131. Upwardly of the electric motor unit 104, a driver's seat 116 is disposed, thus effectively utilizing the available space.

A contactless charger system for charging the battery pack 106 in a contactless manner consists essentially of a primary coil unit 108 which is disposed on a ground surface and a secondary coil unit 107 which is to be mounted to the electric work vehicle. In the example shown in FIG. 3, the primary coil unit 108 has a two-level structure, with a coil power supply circuit section 181 being disposed in its lower level and a primary coil 180 being disposed in its upper level, respectively. Between the coil power supply circuit section 181 and the primary coil 180, a lift mechanism 108a is provided. With this lift mechanism 108a, a ground-height adjustment of the primary coil 180 is possible. The coil power supply circuit section 181, the primary coil 180 and the lift mechanism 108a are housed in a box-like housing 108b. The housing 108b includes wheels 185 for movement and stoppers 186 for maintaining a stop position. The secondary coil unit 107 includes a secondary coil 170 to be electromagnetically coupled with the primary coil 180 and a charging circuit section 171 for rectifying power from the secondary coil 170 and supplying the rectified power to the battery pack 106. In the example shown in FIG. 3, the secondary coil 170 and the charging circuit section 171 together constituting the secondary coil unit 107 are not integrated to each other, but the secondary coil 170 is disposed at a lower portion of the battery pack 106 and the charging circuit section 171 is disposed at an upper portion of the battery pack 106. The secondary coil 170 extends into the rear recess BS which is a recess formed at the lower portion of the battery pack 106 and is supported to either one or both of the battery pack 106 and the vehicle body frame 120 with using a coil supporting member 179.

Figure 5:
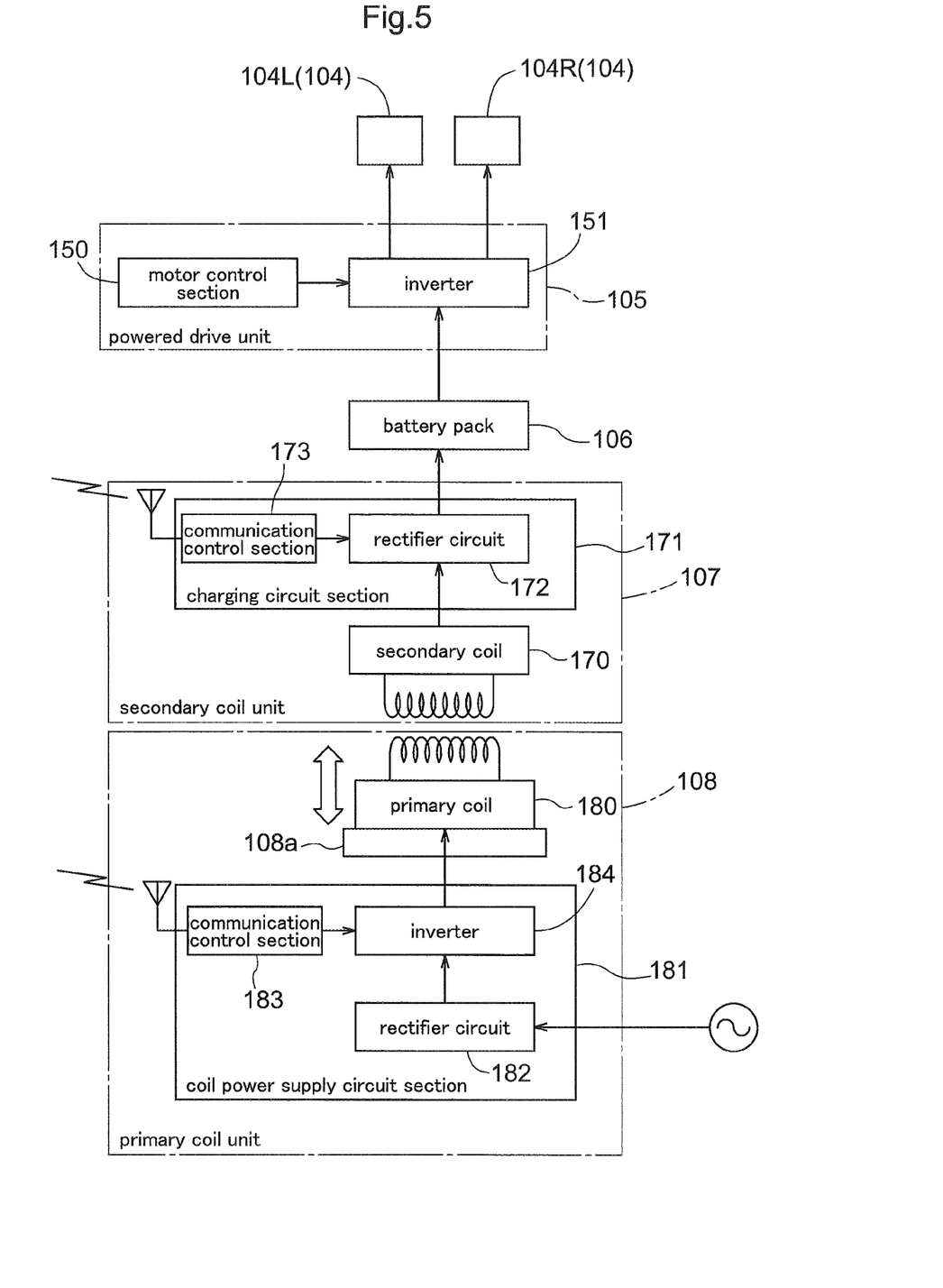
FIG. 5 is a functional block diagram showing a basic configuration of an electric circuit of the contactless charger system.

As shown in FIG. 5, the coil power supply circuit section 181 of the primary coil unit 108 includes a rectifier circuit 182, a communication control section 183 and an inverter 184. The charging control circuit 171 of the secondary coil unit 7 includes a rectifier circuit 172 and a communication control section 173. The rectifier circuit 182 is connected via a power cable to a commercial power source and generates a DC voltage and provides this to the inverter 184. The inverter 184 generates an alternating voltage from the DC voltage inputted thereto and provides this AC voltage to the primary coil 180. The AC voltage generated by the secondary coil 170 which is electromagnetically coupled with the primary coil 180 is supplied to the rectifier circuit 172 of the charging circuit section 171, whereby the a charging DV voltage having a predetermined voltage value is outputted from the rectifier circuit 172. The rectifier circuit 172 is connected to the battery pack 106, so that with the charging DC voltage, a charging electric current is fed to the battery pack 106.

The communication control section 183 of the coil power supply circuit section 181 and the communication control section 173 of the charging control circuit 171 can communicate with each other via wireless communication. At the time of charging of the battery pack 106, charging information is communicated, so that the coil power supply circuit section 181 and the charging circuit section 171 are controlled. The coil power supply circuit section 181 and/or the charging circuit section 171 include(s) a reporting device(s) (a buzzer 191 or a lamp 192, etc., see FIG. 3) for reporting entrance of the primary coil 180 and the secondary coil 170 into appropriate positions.

Incidentally, the battery pack 106 is connected to a powered drive unit 105 as its output destination. The powered drive unit 105 includes a motor control section 150 and an inverter 151, so that a motor driving signal outputted from the inverter 151 based on a control signal from the motor control circuit 150 is transmitted to the left motor 104L and the right motor 104R.

Figure 6:
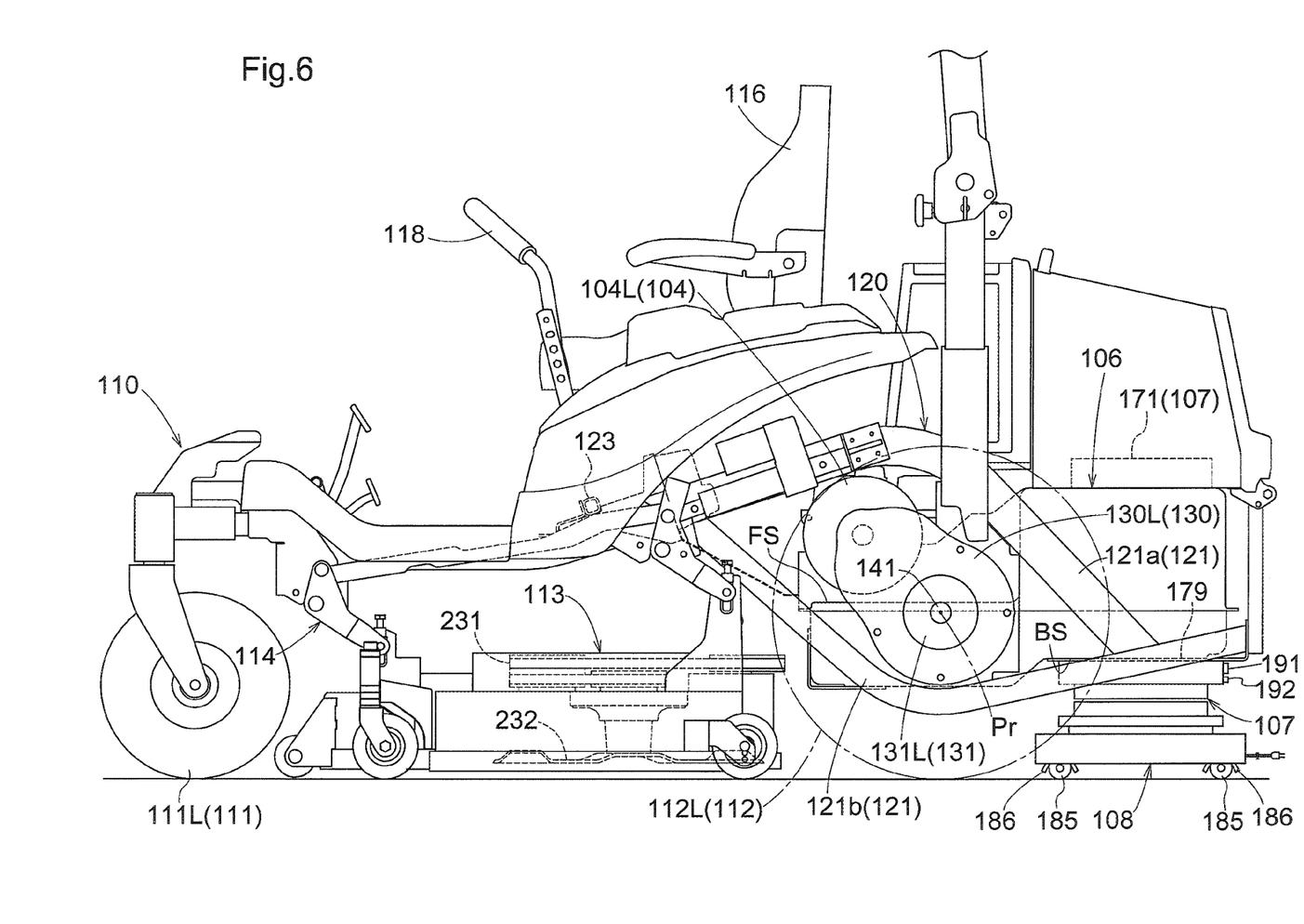
FIG. 6 is a side view of the electric grass mower machine.
Figure 7:
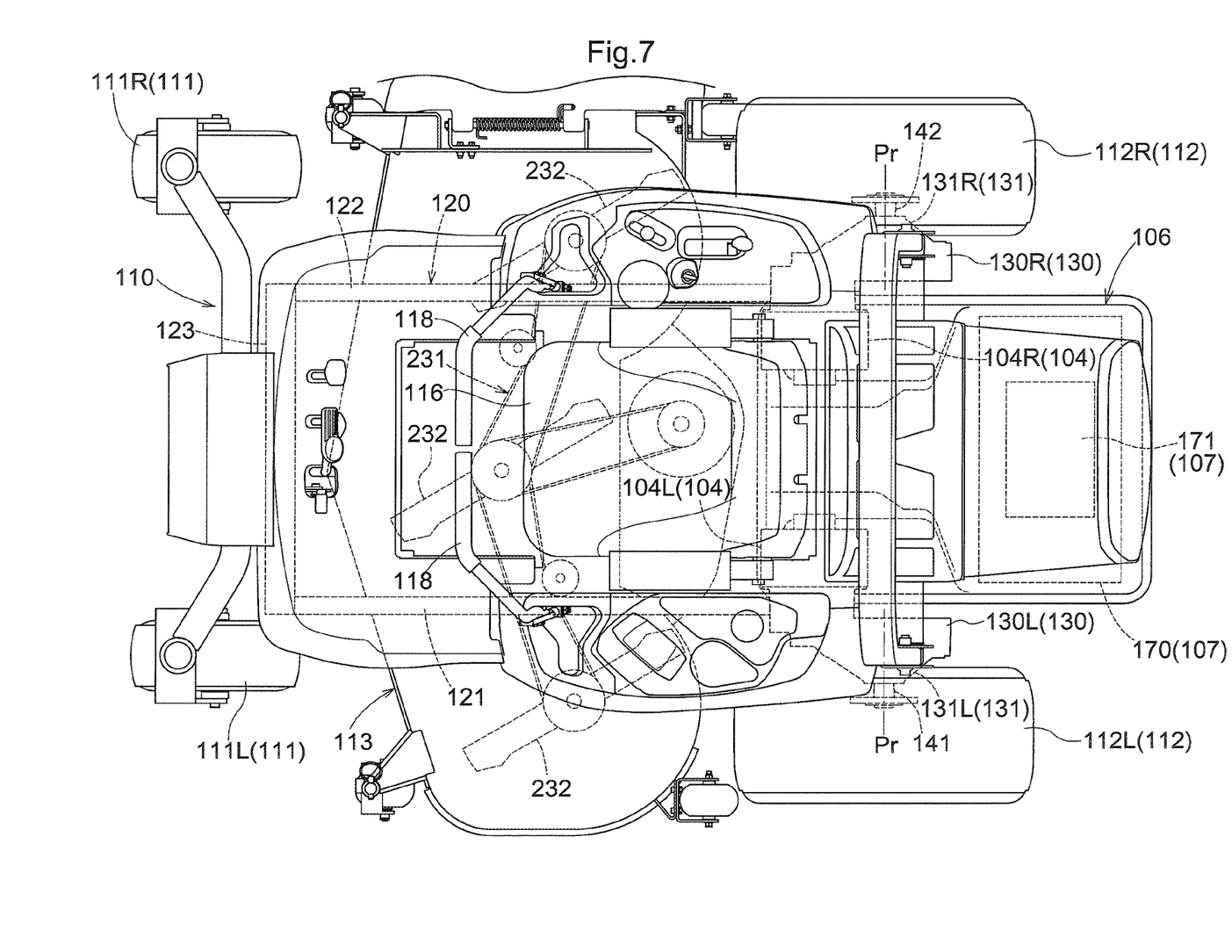
FIG. 7 is a plane view of the electric grass mower machine.

Next, with reference to the accompanying drawings, a specific embodiment of the electric work vehicle will be explained. FIG. 6 is a side view of a mid-mount electric grass mower machine as an example of the electric work vehicle. FIG. 7 is its plane view. This electric grass mower machine (to be referred to simply as a "grass mower machine" hereinafter) employs the contactless charger system which was explained above with reference to FIG. 3, FIG. 4 and FIG. 5.

As shown in FIG. 6 and FIG. 7, the grass mower machine includes a vehicle body 110 and this vehicle body 110 is supported on the ground surface by the caster type front wheel unit 111 consisting of the left front wheel 111L and the right front wheel 111R and the rear wheel unit 120 consisting of the left rear wheel 112L and the right rear wheel 112R that are rotatably driven. The vehicle body 110 consists of the left frame 121, the right frame 122, and the cross beam 123 interconnecting the left frame 121 and the right frame 122. Between the front wheel unit 111 and the rear wheel unit 112, a mower unit 113 is suspended from the vehicle body frame 20 via a link mechanism 114. The mower unit 113 includes a blade transmission mechanism 213 and a blade 232 that is rotated by this blade transmission mechanism 231. At a vehicle body front-rear center region of the vehicle body 110, a driver's seat 116 is disposed.

Figure 8:
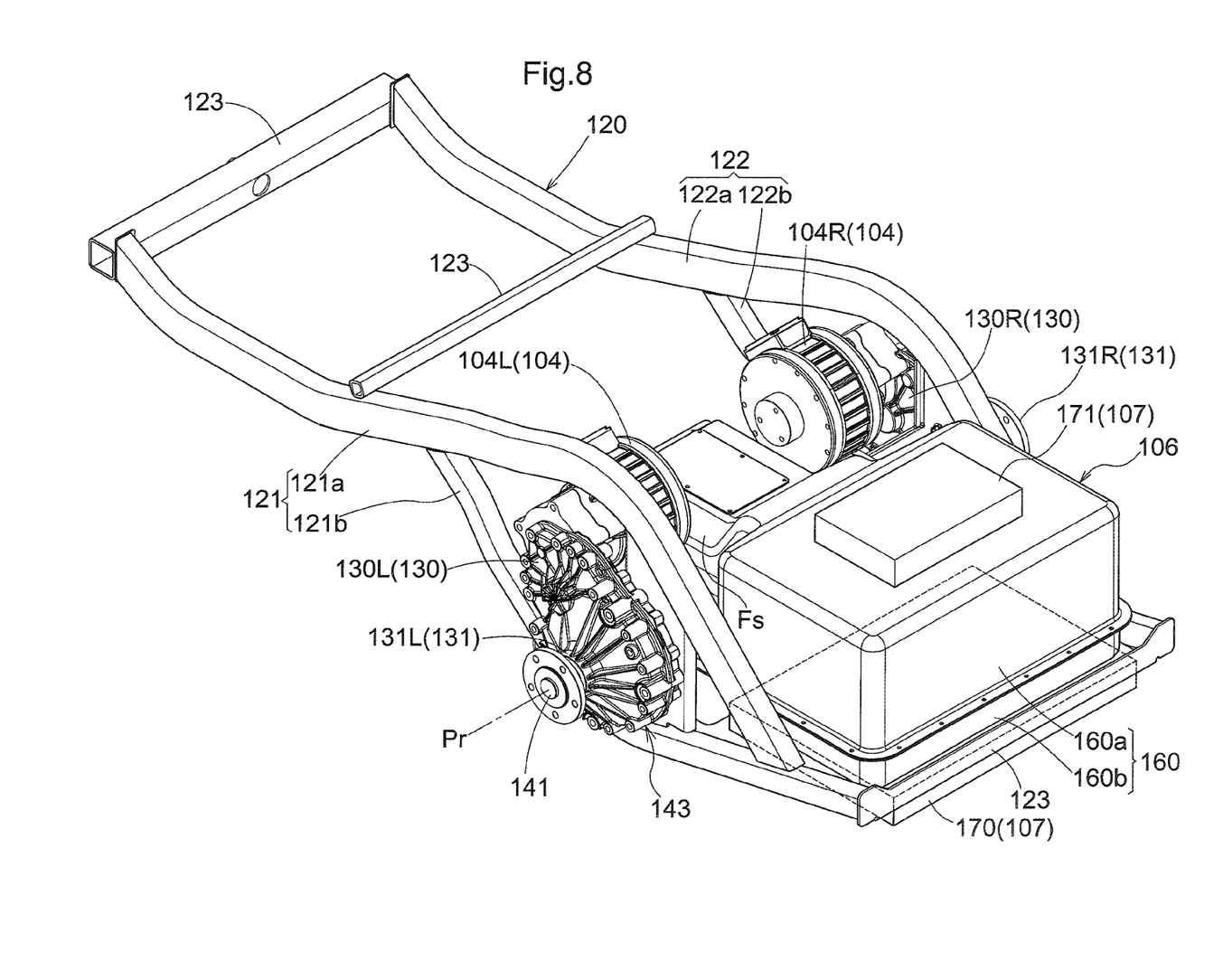
FIG. 8 is a perspective view showing a supporting arrangement for a battery pack, an electric motor unit and a transmission, in a vehicle body frame.

As shown in FIG. 8, the left frame 121 and the right frame 122 vertically branch from each other at their intermediate portions extending in the front-rear direction and become connected to each other again at their rear regions. Namely, the left frame 121, in its rear half region, includes an upper frame portion 121a and a lower frame portion 121b. Similarly, the right frame 122, in its rear half region, includes an upper frame portion 122a and a lower frame portion 122b. As seen in a side view, in a region between the upper frame portion 121a and the lower frame portion 121b of the left frame 121, the left transmission 130L is disposed. In a region between the upper frame portion 122a and the lower frame portion 122b of the right frame 122, the right transmission 130R is disposed. To the left transmission 130L, the left rear axle case 131L is connected continuously. To this left rear axle case 131L, the left ar wheel 112L is supported. To the right transmission 130R, the right rear axle case 131R is connected continuously. And, to this right rear axle case 131R, the right rear wheel 112R is supported. The left rear axle case 131L comprises a tubular body that encloses a left rear axle 141 of the left rear wheel 112L and bears and supports this axle and has a truncated conical outer shape. Similarly, the right rear axle case 131R comprises a tubular body that encloses a right rear axle 142 of the right rear wheel 112R and bears and supports this axle and has a truncated conical outer shape. The battery pack 106 is arranged such that as seen in a plane view, the gravity center of the battery pack 106 is located substantially on the vehicle body front-rear centerline and the pack is confined within the length of the rear wheel radius on the front side and rear side from the rear wheel axis Pr.

The left transmission 130L comprises a gear transmission mechanism and extends forwardly in the vehicle body front-rear direction perpendicularly to the rear axis Pr which is also a center axis of the left rear axle case 131L. The left transmission 130L and the left rear axle case 131L are formed integral with each other, with the left motor 104L being connected to an input portion of the left transmission 130L. Similarly, the right transmission 130R comprises a gear transmission mechanism and extends forwardly in the vehicle body front-rear direction perpendicularly to the rear axis Pr which is also a center axis of the right rear axle case 131R. The right transmission 130R and the right rear axle case 131R are formed integral with each other, with the right motor 104R being connected to an input portion of the right transmission 130R.

Change speed operations of the left motor 104L and the right motor 104R are effected by a pair of left and right speed changer levers 118 (see FIG. 5 and FIG. 6) that are disposed on the opposed sides of the driver's seat 116. When the speed changer lever 118 is maintained at a front-rear neutral position, the left motor 104L or the right motor 104R corresponding thereto is rendered into a stopped state. When the speed changer lever 118 is operated forwardly from the neutral position, there is realized a forward speed change. When the lever 118 is operated reversely, reverse drive is provided for realizing reverse speed change. By independent operations on the pair of left and right speed changer levers 118, the left motor 104L and the right motor 104R can be driven in variable speeds independently of each other.

Figure 9:
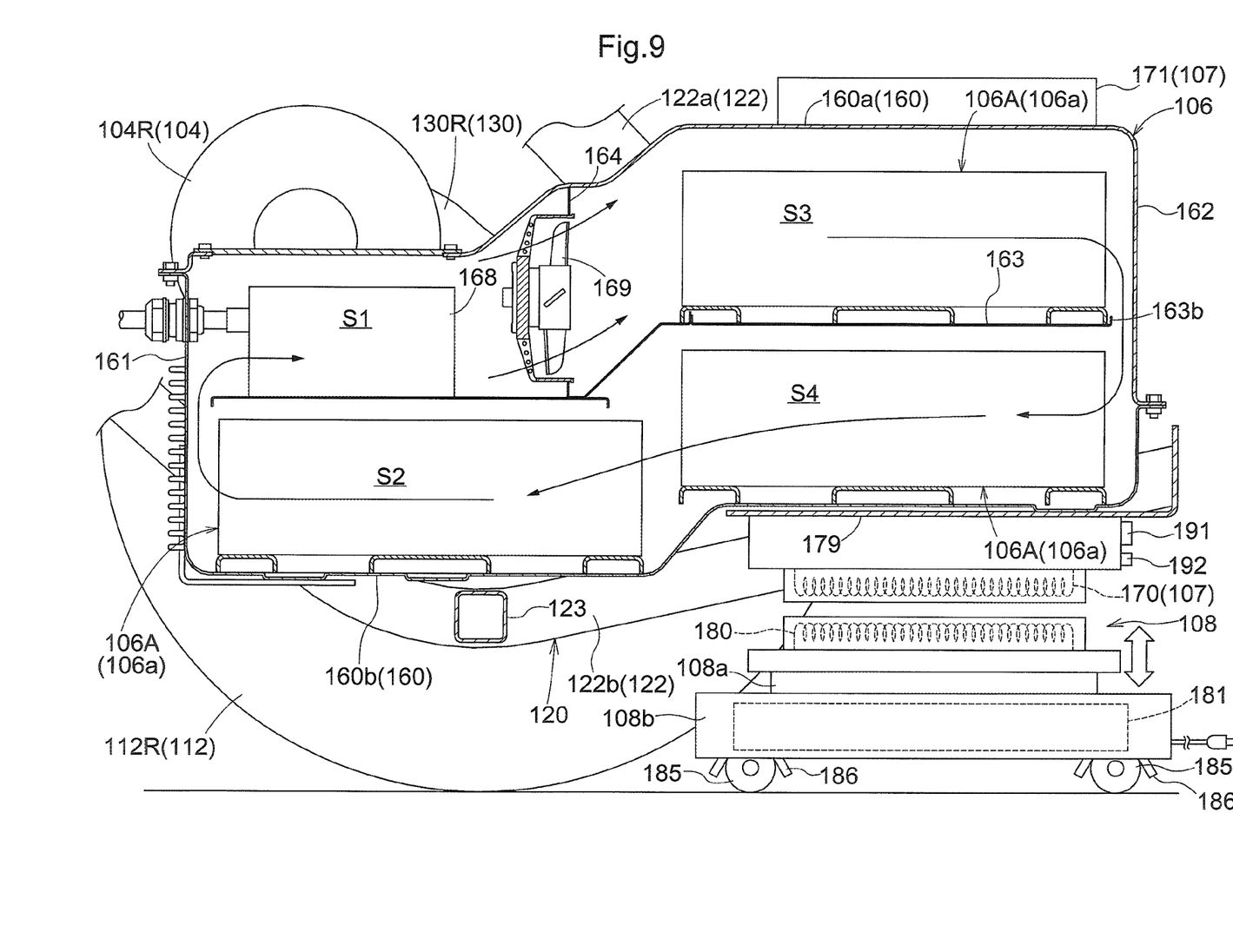
FIG. 9 is a vertical section view sectioned along a perpendicular plane in the vehicle body front-rear direction, of a region including the battery pack and the contactless charger system.

As shown in FIG. 8 and FIG. 9, the battery pack 106 includes a plurality of battery modules 106A accommodated in a battery case 160. The battery case 160 comprises a molded article which can be vertically split into two parts, i.e. consisting of an upper case 160a and a lower case 160b. Incidentally, here, the front half of the battery case 160 will be referred to as a front case portion 161 and the rear half of the same will be referred to as a rear case portion 162, respectively.

The rear case portion 162 is vertically offset relative to the front case portion 161. With this arrangement, the battery case 160 comprises a stepped cubic shape having a level difference between the front case portion 161 and the rear case portion 162.

As shown in FIG. 9, inside the battery case 160 which is divided into the upper case 160a and the lower case 160b, there is provided a horizontal partitioning wall 163 which vertically divides the interior into the front case portion 161 and the rear case portion 162. By means of this horizontal partitioning wall 163, the interior of the front case portion 161 is divided into an upper side first space S1 and a lower side second space S2 and the interior of the rear case portion 162 is divided into an upper side third space S3 and a lower side fourth space S4. The horizontal partitioning wall 163 comprises a plate member which is formed by a bending work of the plate member into a shape having a vertical level difference similarly to the battery case 160, with the second space S2, the third space S3 and the fourth space S4 having substantially same shapes and volumes. The first space S1 is smaller than the other spaces in its width and height. Between the first space S1 and the third space S3, a vertical partitioning wall 164 is provided.

The first space S1 accommodates an electrical unit 168. The second space S2 and the third space S3 respectively accommodate a battery module 106A having identical specifications. Inside this battery module 106A, many battery cells 106a are accommodated.

The first space S1 accommodates the electrical unit 168 comprised of a relay, a fuse, etc. provided in electric wires for connecting the battery module 106A to the outside. To the vertical partitioning wall 164, there is attached a circulator fan 169 for sucking air of the first space S1 and feeding this air to the third space S3. The electric line of the circulator fan 169 is incorporated in the electrical unit 168. Inside the battery case 160, there is formed a circulation air passage (represented by arrows in FIG. 9) that exits the circulator fan 169 and passes through the third space S3, the fourth space S4 and the second space S2 and then reaches the first space S1 and returns eventually to the circulator fan 169. With circulation air flowing in this circulation air passage, temperatures of the four spaces of the battery case 160 are equalized.

As shown in FIG. 9, the secondary coil 170 is held by the coil supporting member 179 to face the lower face of the lower case 160b of the battery pack 106. The coil supporting member 179 is fixed to the vehicle body frame 120 via the cross bar that connects the lower frame portion 121b of the left frame 121 to the lower frame portion 122b of the right frame 122. The secondary coil 170 is disposed between the left side lower frame portion 121b and the right side lower frame portion 122b in such a manner that magnetic lines thereof are oriented in the vertical direction. Thus, the left side lower frame portion 121b and the right side lower frame portion 122b serve as "protection fences" in the vehicle body transverse direction.

The primary coil unit 108 is moved such that its primary coil 180 is located directly under the secondary coil 170. In the course of this, its position adjustment in the vehicle body transverse direction is effected by a movement of the primary coil unit 108 and it position adjustment in the vehicle body front-rear direction is effected by a creeping speed forward traveling of the grass mower machine. To the coil supporting member 179, there are attached the buzzer 191 and the lamp 192 as reporting devices that report when the primary coil 180 and the secondary coil 170 reach appropriate positional relation with each other (when appropriate electric power is transferred). Similar reporting devices can be provided in the primary coil unit 108 also if desired. Further, it is also possible to arrange such that a lamp of the control panel acts also as such reporting device for the positional alignment between the primary coil 180 and the secondary coil 170 by steering of the grass mower machine.

Alternative Embodiments of Second Embodiment (1) In the foregoing embodiment, the primary coil unit 108 includes the primary coil 180 and the coil power supply circuit section 181 in two levels. Instead, these may be disposed side by side.

(2) In the foregoing embodiment, the primary coil unit 107 mounts the secondary coil 170 and the charging circuit section 171 separately at upper and lower portions of the battery pack 106. Instead, these may be integrated to each other and disposed at a lower portion of the battery pack 106.

(3) In the foregoing embodiment, an electric grass mower machine was cited as an example of an electric work vehicle including the contactless charger system of the present invention. Instead, the invention is applicable also to an agricultural work machine such as a rice planter, a combine harvester, a tractor, etc. or to a civil engineering machine such as a backhoe, a bucket loader, etc.

(4) The contactless charger system of the present invention is applicable to an electric work vehicle having a rechargeable battery pack. The electric grass mower machine of the present invention is applicable to an electric grass mower machine employing the contactless charger system.

The invention claimed is:

1. A portable charger device for charging a vehicle side battery mounted on an electric vehicle, device comprising:
   a charger device side battery;
   a first charging control section configured to perform non-quick charging of the charger device side battery by power supply from an external power source; and
   a second charging control section electrically separated from the first charging control section by a battery control section for the charger device side battery, the second charging control section being configured to perform quick charging of the vehicle side battery by power supply from the charger device side battery,
   wherein the second charging control section includes a converter configured to convert a voltage supplied by the charger device side battery to a higher voltage for quick charging the vehicle side battery, and
   wherein the higher voltage for quick charging the vehicle side battery is greater than a voltage provided by the first charging control section for non-quick charging the charger device side battery.

2. The portable charger device according to claim 1, wherein the portable charger device includes a wheeled frame.

3. The portable charger device according to claim 2, wherein the wheeled frame comprises a towed vehicle body that can be towed by the electric vehicle.

4. The portable charter device according to claim 1, wherein there are provided a solar cell unit and a third charging control section for charging the charger device side battery by power supply from the solar cell unit.

5. The portable charger device according to claim 1, wherein the first charging control section employs a commercial AC power source as the external power source.

6. The portable charger device according to claim 1, wherein the first charging control section employs a car 12V battery as the external power source.

* * * * *

UNITED STATES PATENT AND TRADEMARK OFFICE
CERTIFICATE OF CORRECTION

PATENT NO. : 10,538,166 B2  
APPLICATION NO. : 15/378868  
DATED : January 21, 2020  
INVENTOR(S) : Hirokazu Ito et al.

Page 1 of 1

It is certified that error appears in the above-identified patent and that said Letters Patent is hereby corrected as shown below:

In the Claims

Column 14, Line 27, Claim 4, delete "charter" and insert -- charger --

Signed and Sealed this  
Fifth Day of May, 2020

Andrei Iancu  
*Director of the United States Patent and Trademark Office*